(12) United States Patent
Kogure et al.

(10) Patent No.: US 10,622,152 B2
(45) Date of Patent: Apr. 14, 2020

(54) MULTI-LAYER CERAMIC CAPACITOR AND METHOD OF PRODUCING THE SAME

(71) Applicant: Taiyo Yuden Co., Ltd., Tokyo (JP)

(72) Inventors: Toshimitsu Kogure, Tokyo (JP); Joji Kobayashi, Tokyo (JP); Yasunari Kato, Tokyo (JP); Yosuke Sato, Tokyo (JP); Tetsuhiko Fukuoka, Tokyo (JP); Ryo Ono, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/782,412

(22) Filed: Oct. 12, 2017

(65) Prior Publication Data

US 2018/0108482 A1    Apr. 19, 2018

(30) Foreign Application Priority Data

Oct. 17, 2016    (JP) .................. 2016-203385

(51) Int. Cl.

| | |
|---|---|
| H01G 4/30 | (2006.01) |
| H01G 4/012 | (2006.01) |
| H01G 4/224 | (2006.01) |
| H01G 4/008 | (2006.01) |
| H01G 4/01 | (2006.01) |
| H01G 4/12 | (2006.01) |
| H01G 4/232 | (2006.01) |

(52) U.S. Cl.
CPC ............ *H01G 4/30* (2013.01); *H01G 4/008* (2013.01); *H01G 4/01* (2013.01); *H01G 4/012* (2013.01); *H01G 4/12* (2013.01); *H01G 4/224* (2013.01); *H01G 4/232* (2013.01)

(58) Field of Classification Search
CPC ............ H01G 4/30; H01G 4/008; H01G 4/01; H01G 4/12
See application file for complete search history.

(56) References Cited

U.S. PATENT DOCUMENTS

| | | | |
|---|---|---|---|
| 2012/0229949 A1 | 9/2012 | Kim | |
| 2012/0229950 A1* | 9/2012 | Kim | H01G 4/005 361/321.2 |
| 2012/0234462 A1 | 9/2012 | Matsui et al. | |
| 2012/0262840 A1 | 10/2012 | Koizumi | |
| 2013/0148262 A1* | 6/2013 | Shimizu | H01G 4/005 361/311 |

(Continued)

FOREIGN PATENT DOCUMENTS

| | | |
|---|---|---|
| JP | 2007-66997 A | 3/2007 |
| JP | 2012-191159 A | 10/2012 |

(Continued)

OTHER PUBLICATIONS

Office Action dated Jan. 8, 2019 in Japanese Application No. 2016-203385, along with its English translation.

*Primary Examiner* — Dion Ferguson

(74) *Attorney, Agent, or Firm* — Saliwanchik, Lloyd & Eisenschenk

(57) ABSTRACT

A multi-layer ceramic capacitor includes a multi-layer unit and a side margin. The multi-layer unit includes ceramic layers laminated in a first direction and internal electrodes disposed between the ceramic layers. The side margin covers the multi-layer unit from a second direction orthogonal to the first direction and has a porosity of 1% or less.

9 Claims, 17 Drawing Sheets

(56) References Cited

U.S. PATENT DOCUMENTS

| | | | |
|---|---|---|---|
| 2014/0126110 A1* | 5/2014 | Kim | H01G 4/12 |
| | | | 361/321.2 |
| 2014/0285946 A1* | 9/2014 | Yoon | H01G 4/008 |
| | | | 361/301.4 |
| 2014/0301012 A1 | 10/2014 | Kim | |
| 2014/0301014 A1 | 10/2014 | Kim | |
| 2014/0301015 A1* | 10/2014 | Kim | H01G 4/30 |
| | | | 361/301.4 |
| 2015/0155097 A1* | 6/2015 | Kim | H01G 4/008 |
| | | | 174/260 |
| 2015/0200054 A1* | 7/2015 | Lee | H01G 4/12 |
| | | | 174/258 |
| 2016/0196918 A1* | 7/2016 | Hong | H01G 4/0085 |
| | | | 174/260 |
| 2016/0293331 A1* | 10/2016 | Kitamura | H01G 4/30 |
| 2016/0293332 A1* | 10/2016 | Kato | H01G 4/30 |
| 2016/0351335 A1* | 12/2016 | Kato | H01G 4/30 |
| 2017/0076869 A1* | 3/2017 | Okai | H01G 4/0085 |
| 2017/0076870 A1* | 3/2017 | Noda | H01G 4/30 |

FOREIGN PATENT DOCUMENTS

| | | |
|---|---|---|
| JP | 2012-209539 A | 10/2012 |
| JP | 2012-227260 A | 11/2012 |
| JP | 2014-187216 A | 10/2014 |
| JP | 2014-204113 A | 10/2014 |
| JP | 2014-204114 A | 10/2014 |
| JP | 2014-204116 A | 10/2014 |

\* cited by examiner

MULTI-LAYER CERAMIC CAPACITOR AND METHOD OF PRODUCING THE SAME

CROSS REFERENCE TO RELATED APPLICATIONS

This application claims priority to Japanese Application No. 2016-203385, filed Oct. 17, 2016, the disclosure of which is incorporated herein by reference in its entirety.

BACKGROUND

The present invention relates to a multi-layer ceramic capacitor including side margins provided in a subsequent step, and to a method of producing the multi-layer ceramic capacitor.

Along with miniaturization and achievement of high performance of electronic devices, there have recently been increasingly strong demands for miniaturization, increase in capacitance, and the like with respect to multi-layer ceramic capacitors used in the electronic devices. In order to meet those demands, it is effective to enlarge an intersectional area of internal electrodes of the multi-layer ceramic capacitor as much as possible.

For example, Japanese Patent Application Laid-open Nos. 2012-191159 and 2014-204116 each describe a technique in which side margins for ensuring insulation properties of the periphery of the internal electrodes are provided to a multi-layer chip in a subsequent step, the internal electrodes being exposed to the side surfaces of the multi-layer chip. This technique makes it possible to form thin side margins and relatively increase the intersectional area of the internal electrodes.

SUMMARY

However, in the technique in which the side margins are provided to the side surfaces of the multi-layer chip in a subsequent step, when the thickness of the side margins is small, moisture or the like is caused to easily infiltrate into the multi-layer chip from the outside via the side margins having the small thickness. This may reduce moisture resistance of the multi-layer ceramic capacitor.

In view of the circumstances as described above, it is desirable to provide a multi-layer ceramic capacitor and a method of producing the same, which ensure moisture resistance even when the thickness of a side margin is made small.

According to an embodiment of the present invention, there is provided a multi-layer ceramic capacitor including a multi-layer unit and a side margin.

The multi-layer unit includes ceramic layers laminated in a first direction and internal electrodes disposed between the ceramic layers.

The side margin covers the multi-layer unit from a second direction orthogonal to the first direction and has a porosity of 1% or less.

In this configuration, the side margin has a porosity of 1% or less. With this configuration, because of high compactness of the side margin, moisture or the like is difficult to infiltrate into the multi-layer chip from the outside via the side margin even when the thickness of the side margin is made small.

Therefore, according to the embodiment of the present invention, it is possible to produce a multi-layer ceramic capacitor that ensures moisture resistance even when the thickness of the side margin is made small.

A dimension of the side margin in the second direction may be 5 μm or more.

This can improve the moisture resistance of the multi-layer ceramic capacitor.

Each of the internal electrodes may include an oxidized area, the oxidized area being adjacent to the side margin and having a dimension in the second direction that is 0.4 μm or more.

Setting the dimension of the oxidized area in the second direction to 0.4 μm or more can suppress a short circuit failure or an insulation resistance (IR) failure between the internal electrodes of the multi-layer ceramic capacitor.

A dimension of the side margin in the second direction may be 15 μm or less.

With this configuration, the moisture resistance of the multi-layer ceramic capacitor is ensured.

The dimension of the side margin in the second direction may be 10 μm or less.

With this configuration, whether the side margin is peeled off from the multi-layer unit or not can be detected using an optical microscope or the like without destroying the multi-layer ceramic capacitor.

The multi-layer unit may include a cover, a dimension of the cover in the first direction being equal to or larger than a dimension of the side margin in the second direction.

With this configuration, moisture or the like is difficult to infiltrate into the multi-layer unit from the outside, and reduction in moisture resistance of the multi-layer ceramic capacitor can be suppressed.

According to another embodiment of the present invention, there is provided a method of producing a multi-layer ceramic capacitor, the method including: producing an unsintered multi-layer chip including a capacitance forming unit and a cover, the capacitance forming unit including ceramic layers laminated in a first direction and internal electrodes disposed between the ceramic layers, the cover being made of insulating ceramics and covering the capacitance forming unit from the first direction; producing an unsintered body by covering the unsintered multi-layer chip by a side margin made of insulating ceramics from a second direction orthogonal to the first direction; and producing a body by sintering the unsintered body, the side margin of the body after subjected to the sintering having a porosity of 1% or less.

In this configuration, the side margin after subjected to the sintering has a porosity of 1% or less. With this configuration, because of high compactness of the side margin after subjected to the sintering, moisture or the like is difficult to infiltrate into the capacitance forming unit from the outside via the side margin even when the thickness of the side margin is made small. Therefore, by the above-mentioned method of producing a multi-layer ceramic capacitor, a multi-layer ceramic capacitor that ensures moisture resistance can be produced even when the thickness of the side margin is made small.

A dimension of the cover in the first direction may be equal to or larger than a dimension of the side margin in the second direction.

With this configuration, moisture or the like is difficult to infiltrate into the multi-layer chip from the outside, and reduction in moisture resistance of the multi-layer ceramic capacitor can be suppressed.

A dimension of the side margin in the second direction may be 20 μm or less.

With this configuration, oxygen is easily supplied to the internal electrodes via the side margin when the unsintered body is sintered, and the oxidized areas are thus successfully formed at the ends of the internal electrodes.

Therefore, even when foreign substances or the like adhere to the side surfaces of the multi-layer chip in the production process, in which the ends of the internal electrodes are exposed, electrical conduction between the internal electrodes via the foreign substances or the like on the side surfaces of the sintered body is suppressed. Consequently, a short circuit failure, an IR failure, or the like between the internal electrodes is effectively suppressed.

The multi-layer chip may punch out a side margin sheet mainly made of insulating ceramics, to cover the unsintered body with the side margin.

The unsintered body may be subjected to hydrostatic pressing.

The unsintered body may be subjected to debinder processing, and ceramics may be deposited on the side margin subjected to the debinder processing.

Powder of ceramics may be sprayed on the side margin subjected to the debinder processing.

Ceramics may be spattered on the side margin subjected to the debinder processing.

Ceramics may be vacuum-deposited on the side margin subjected to the debinder processing.

It is possible to provide a multi-layer ceramic capacitor and a method of producing the same, which ensure moisture resistance even when the thickness of a side margin is made small.

These and other objects, features and advantages of the present invention will become more apparent in light of the following detailed description of embodiments thereof, as illustrated in the accompanying drawings.

DETAILED DESCRIPTION OF EMBODIMENTS

Hereinafter, an embodiment of the present invention will be described with reference to the drawings.

In the figures, an X axis, a Y axis, and a Z axis orthogonal to one another are shown as appropriate. The X axis, the Y axis, and the Z axis are common in all figures.

1. OVERALL CONFIGURATION OF MULTI-LAYER CERAMIC CAPACITOR 10

Figure 1:
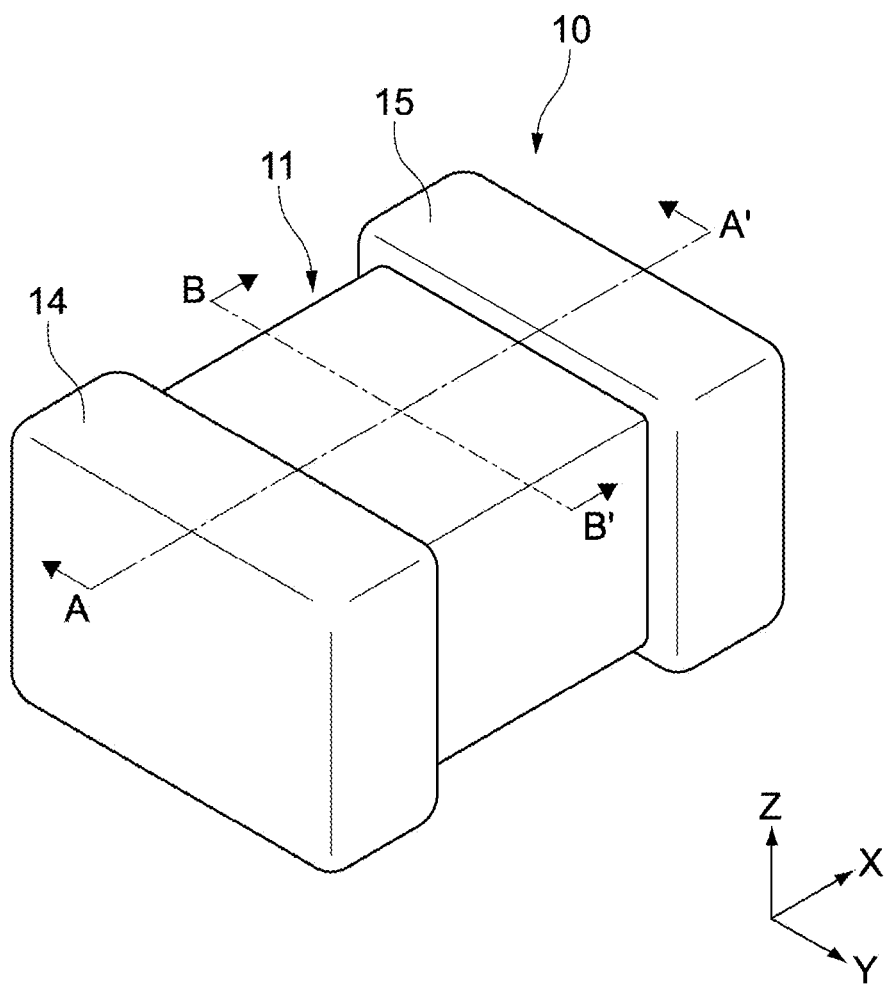
FIG. 1 is a perspective view of a multi-layer ceramic capacitor according to one embodiment of the present invention.
Figure 2:
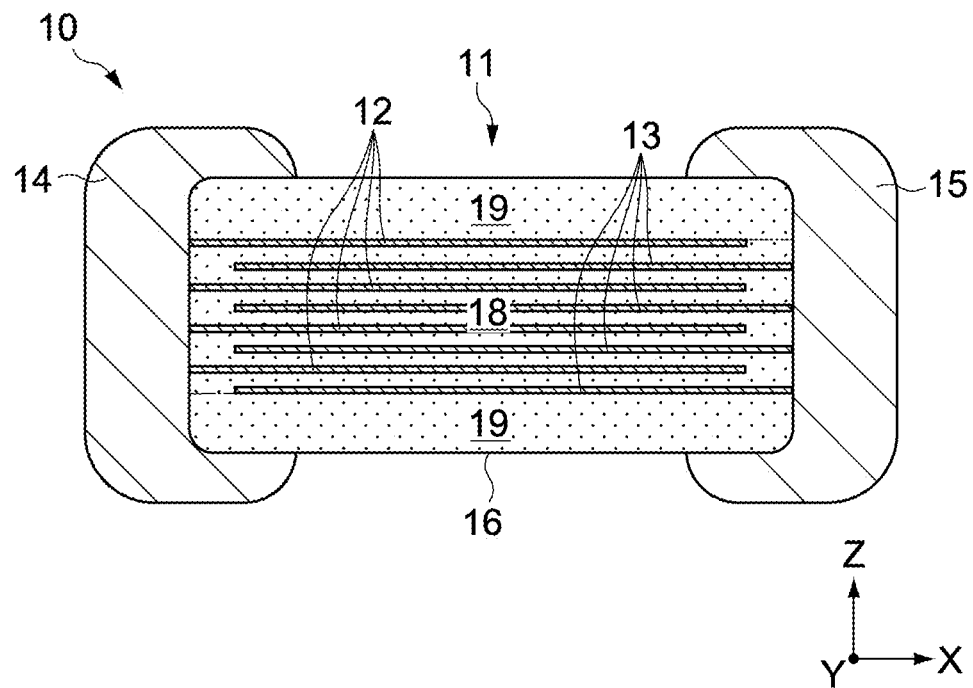
FIG. 2 is a cross-sectional view of the multi-layer ceramic capacitor taken along the A-A' line in FIG. 1.
Figure 3:
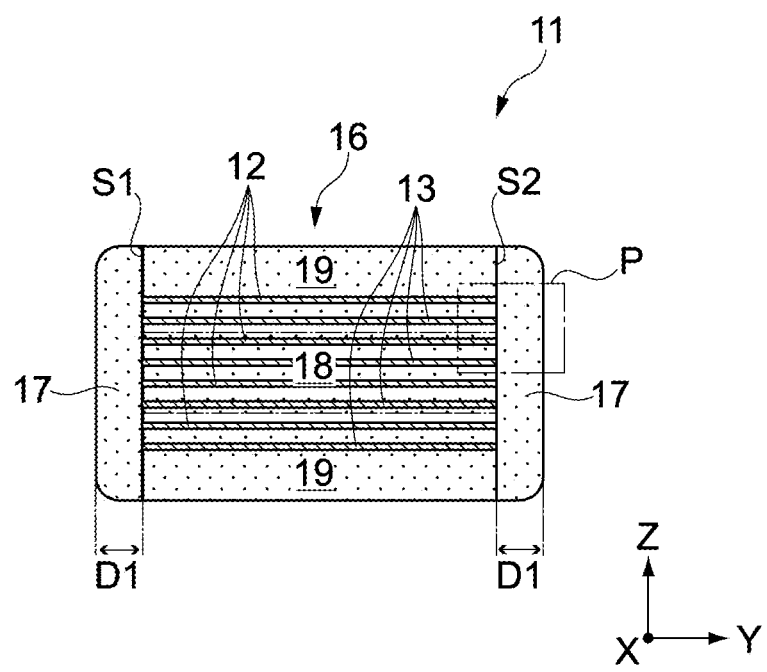
FIG. 3 is a cross-sectional view of the multi-layer ceramic capacitor taken along the B-B' line in FIG. 1.

FIGS. 1 to 3 each show a multi-layer ceramic capacitor 10 according to one embodiment of the present invention. FIG. 1 is a perspective view of the multi-layer ceramic capacitor 10. FIG. 2 is a cross-sectional view of the multi-layer ceramic capacitor 10 taken along the A-A' line in FIG. 1. FIG. 3 is a cross-sectional view of the multi-layer ceramic capacitor 10 taken along the B-B' line in FIG. 1.

The multi-layer ceramic capacitor 10 includes a body 11, a first external electrode 14, and a second external electrode 15.

Typically, the body 11 has two side surfaces oriented in a Y-axis direction and two main surfaces oriented in a Z-axis direction. Ridges connecting the respective surfaces of the body 11 are chamfered. It should be noted that the form of the body 11 is not limited to the form as described above. For example, the surfaces of the body 11 may be curved surfaces, and the body 11 may be rounded as a whole.

The first external electrode 14 and the second external electrode 15 cover both end surfaces of the body 11 that are oriented in an X-axis direction, and extend to four surfaces that are connected to both the end surfaces oriented in the X-axis direction. With this configuration, both of the first external electrode 14 and the second external electrode 15 have U-shaped cross sections in parallel with an X-Z plane and an X-Y plane.

The body 11 includes a multi-layer unit 16 and side margins 17.

The multi-layer unit 16 has a configuration in which a plurality of flat plate-like ceramic layers extending along the X-Y plane are laminated in the Z-axis direction.

The multi-layer unit 16 includes a capacitance forming unit 18 and covers 19.

The capacitance forming unit 18 includes a plurality of first internal electrodes 12 and a plurality of second internal electrodes 13. The first internal electrodes 12 and the second internal electrodes 13 are alternately disposed between the ceramic layers along the Z-axis direction. The first internal electrodes 12 are connected to the first external electrode 14 and are insulated from the second external electrode 15. The second internal electrodes 13 are connected to the second external electrode 15 and are insulated from the first external electrode 14.

The first internal electrodes 12 and the second internal electrodes 13 are each made of an electrical conductive material and function as internal electrodes of the multi-layer ceramic capacitor 10. Examples of the electrical conductive material include nickel (Ni), copper (Cu), palladium (Pd), platinum (Pt), silver (Ag), gold (Au), and a metal material including an alloy of them. Typically, a metal material mainly containing nickel (Ni) is employed.

The capacitance forming unit 18 is made of ceramics. In the capacitance forming unit 18, in order to increase capacitances of the ceramic layers provided between the first internal electrodes 12 and the second internal electrodes 13, a material having a high dielectric constant is used as a material forming the ceramic layers. For the material forming the capacitance forming unit 18, polycrystal of a barium titanate ($BaTiO_3$) based material, i.e., polycrystal having a Perovskite structure containing barium (Ba) and titanium (Ti) can be used, for example.

Alternatively, the material forming the capacitance forming unit 18 may be, in addition to the barium titanate ($BaTiO_3$) based material, polycrystal of a strontium titanate ($SrTiO_3$) based material, a calcium titanate ($CaTiO_3$) based material, a magnesium titanate ($MgTiO_3$) based material, a calcium zirconate ($CaZrO_3$) based material, a calcium zirconate titanate ($Ca(Zr,Ti)O_3$) based material, a barium zirconate ($BaZrO_3$) based material, a titanium oxide ($TiO_2$) based material, or the like.

The covers 19 each have a flat plate-like shape extending along the X-Y plane and respectively cover the upper and lower surfaces of the capacitance forming unit 18 in the Z-axis direction. The covers 19 are not provided with the first internal electrodes 12 and the second internal electrodes 13.

As shown in FIG. 3, the side margins 17 are formed on both side surfaces S1 and S2 of the capacitance forming unit 18 and covers 19, the side surfaces S1 and S2 being oriented in the Y-axis direction.

In such a manner, in the body 11, except for both the end surfaces, which are oriented in the X-axis direction and to which the first external electrode 14 and the second external electrode 15 are provided, surfaces of the capacitance forming unit 18 are covered with the side margins 17 and the covers 19. The side margins 17 and the covers 19 have main functions of protecting the periphery of the capacitance forming unit 18 and ensuring insulation properties of the first internal electrodes 12 and the second internal electrodes 13.

The side margins 17 and the covers 19 are also made of ceramics. The ceramics forming the side margins 17 and the covers 19 desirably includes polycrystal of dielectrics, which has as a main phase the same type of composition system as that of the capacitance forming unit 18. This leads to suppression of internal stress in the body 11.

The side margins 17 have a porosity of 1% or less. With this configuration, because of high compactness of the ceramics forming the side margins 17, moisture is difficult to infiltrate into the capacitance forming unit 18 from the outside via the side margins 17. Therefore, moisture resistance of the multi-layer ceramic capacitor 10 is ensured.

Furthermore, since the side margins 17 have a porosity of 1% or less, the side margins 17 have high rigidity against a physical impact. This also improves rigidity of the multi-layer ceramic capacitor 10 against a physical impact applied from the outside.

It should be noted that the porosity of this embodiment is calculated by the following procedure, for example. First, a cross section of the side margin 17 is imaged with a scanning electron microscope (SEM) at a predetermined magnification. Subsequently, from a plurality of pores appearing in the image of the cross section of the side margin 17, some pores are selected, and cross-sectional areas of the respective pores are measured to calculate an average value thereof. A ratio of the average value to the imaged cross-sectional area of the side margin 17 is then calculated.

In this embodiment, it is desirable to reduce a dimension D1 of the side margin 17 in the Y-axis direction. When the dimension D1 is reduced, an intersectional area of the first and second internal electrodes 12 and 13 can be enlarged as much as possible, and the capacitance of the multi-layer ceramic capacitor 10 can be increased.

However, in terms of ensuring the moisture resistance of the multi-layer ceramic capacitor 10, the dimension D1 is desirably 5 µm or more.

Further, in this embodiment, it is desirable to set the dimension D1 of the side margin 17 to 10 µm or less. This enables detection of a gap, if there is a gap between the multi-layer unit 16 and the side margin 17, by observing the surface of the side margin 17 with use of an optical microscope or the like.

Therefore, the gap between the multi-layer unit 16 and the side margin 17 can be detected without observing the cross section of the multi-layer ceramic capacitor 10.

In other words, whether the side margin 17 is peeled off from the multi-layer unit 16 or not can be detected using the optical microscope or the like without destroying the multi-layer ceramic capacitor 10.

The side margins 17, the capacitance forming unit 18, and the covers 19 according to this embodiment may further contain, in addition to barium (Ba) and titanium (Ti), one or a plurality of types of a metal element such as magnesium (Mg), manganese (Mn), aluminum (Al), calcium (Ca), vanadium (V), chromium (Cr), zirconium (Zr), molybdenum (Mo), tungsten (W), tantalum (Ta), niobium (Nb), silicon (Si), boron (B), yttrium (Y), europium (Eu), gadolinium (Gd), dysprosium (Dy), holmium (Ho), erbium (Er), ytterbium (Yb), lithium (Li), potassium (K), or sodium (Na).

With the configuration described above, when a voltage is applied between the first external electrode 14 and the second external electrode 15 in the multi-layer ceramic capacitor 10, a voltage is applied to the ceramic layers between the first internal electrodes 12 and the second internal electrodes 13. With this configuration, the multi-layer ceramic capacitor 10 stores charge corresponding to the voltage applied between the first external electrode 14 and the second external electrode 15.

It should be noted that the multi-layer ceramic capacitor 10 according to this embodiment only needs to include the multi-layer unit 16 and the side margins 17, and other configurations can be changed as appropriate. For example, the number of first internal electrodes 12 and second internal electrodes 13 can be determined as appropriate in accordance with the size and performance expected for the multi-layer ceramic capacitor 10.

Further, in FIGS. 2 and 3, in order to make the facing state of the first and second internal electrodes 12 and 13 easily viewable, the number of first internal electrodes 12 and the number of second internal electrodes 13 are each set to four. However, actually, more first and second internal electrodes 12 and 13 are provided so as to ensure the capacitance of the multi-layer ceramic capacitor 10.

Figure 4:
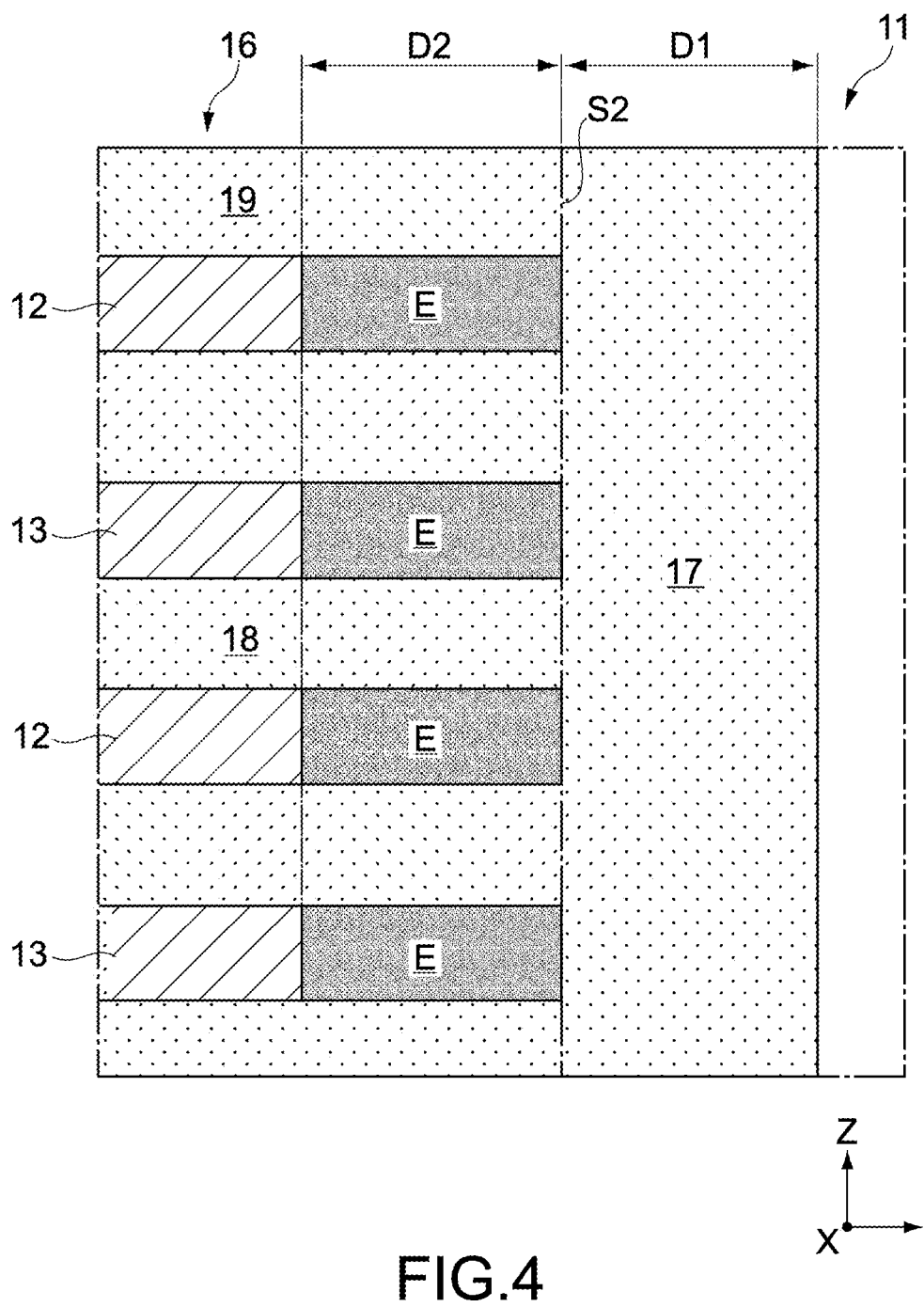
FIG. 4 is an enlarged schematic view of an area P of the multi-layer ceramic capacitor shown in FIG. 3.

FIG. 4 is an enlarged schematic view of an area P shown in FIG. 3 and of ends of the first internal electrodes 12 and the second internal electrodes 13.

As shown in FIG. 4, the first internal electrodes 12 and the second internal electrodes 13 include oxidized areas E at the end of the multi-layer unit 16, the end being exposed to the side surface S2. The oxidized areas E are areas in which electrical conductivity is reduced by oxidation. Further, as shown in FIG. 4, the oxidized areas E are formed at the ends of the first internal electrodes 12 and the second internal electrodes 13 so as to be adjacent to the side margin 17.

As an example, the oxidized areas E are each formed mainly of a composite oxide (for example, ternary oxide) containing a metal element contained in the side margins 17, the covers 19, and the capacitance forming unit 18 and a metal element forming the first internal electrodes 12 and the second internal electrodes 13.

Further, the oxidized areas E are desirably formed at all the ends of the first internal electrodes 12 and the second internal electrodes 13, but may not be partially formed.

A dimension D2 of the oxidized area E in the Y-axis direction can be set to, for example, approximately several hundreds to several thousands nm, desirably, 400 nm or more. In this embodiment, setting the dimension D2 of the oxidized area E to 400 nm or more can suppress a short circuit failure or an insulation resistance (IR) failure between the first internal electrodes 12 and the second internal electrodes 13 of the multi-layer ceramic capacitor 10.

For the purpose of description, FIG. 4 equally shows the dimensions D2 of the plurality of oxidized areas E. In this embodiment, however, the dimensions D2 may differ between the oxidized areas E. In this case, the dimensions D2 of the oxidized areas E can be an average value of the oxidized areas E formed at the ends of all the first internal electrodes 12 and the second internal electrodes 13.

2. METHOD OF PRODUCING MULTI-LAYER CERAMIC CAPACITOR 10

Figure 5:
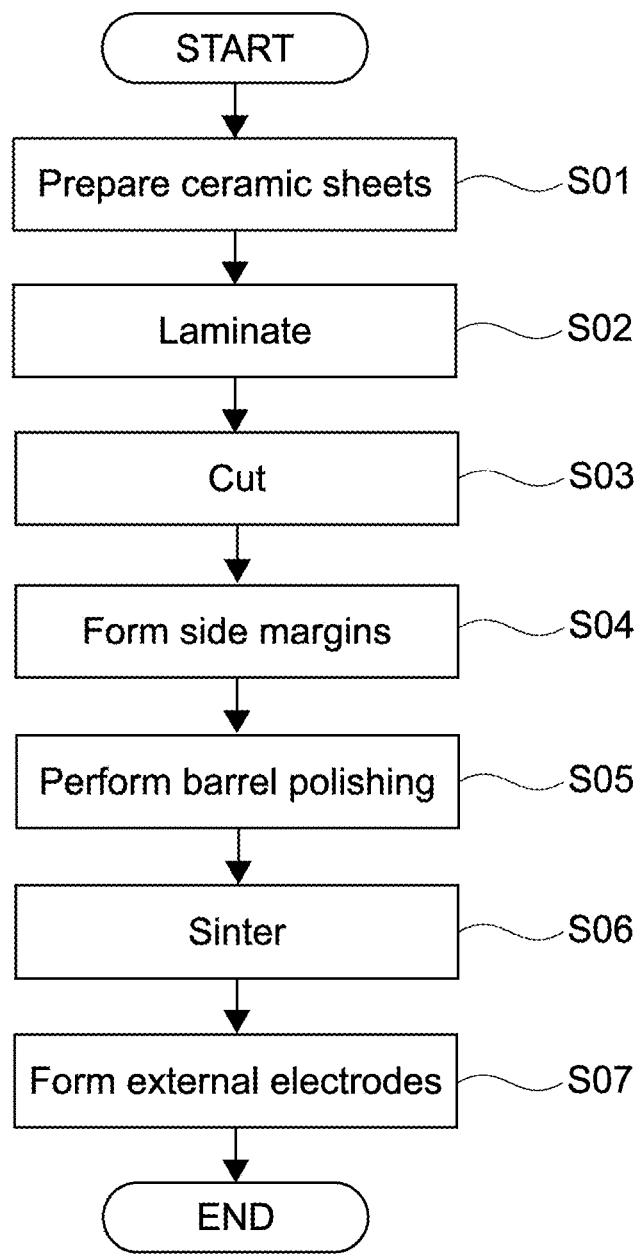
FIG. 5 is a flowchart showing a method of producing the multi-layer ceramic capacitor.

FIG. 5 is a flowchart showing a method of producing the multi-layer ceramic capacitor 10. FIGS. 6A to 16 are views each showing a production process of the multi-layer ceramic capacitor 10. Hereinafter, the method of producing the multi-layer ceramic capacitor 10 will be described along FIG. 5 with reference to FIGS. 6A to 16 as appropriate.

2.1 Step S01: Preparation of Ceramic Sheets

In Step S01, first ceramic sheets 101 and second ceramic sheets 102 for forming the capacitance forming unit 18, and third ceramic sheets 103 for forming the covers 19 are prepared. The first, second, and third ceramic sheets 101, 102, and 103 are mainly made of insulating ceramics and are configured as unsintered dielectric green sheets. The first, second, and third ceramic sheets 101, 102, and 103 are formed into sheets by using a roll coater or a doctor blade, for example.

Figure 6C:
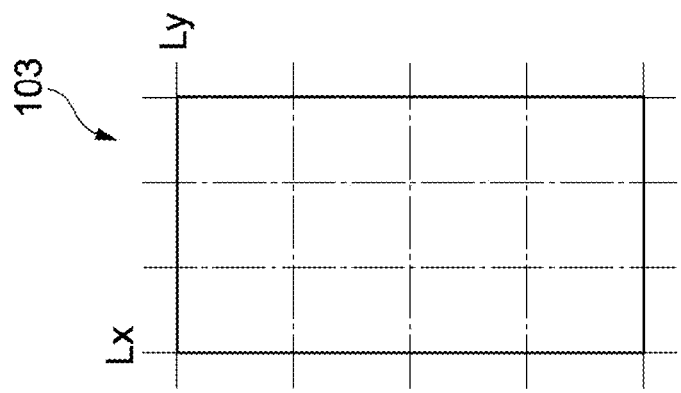
FIG. 6C is a plan view showing a production process of the multi-layer ceramic capacitor.
Figure 6B:
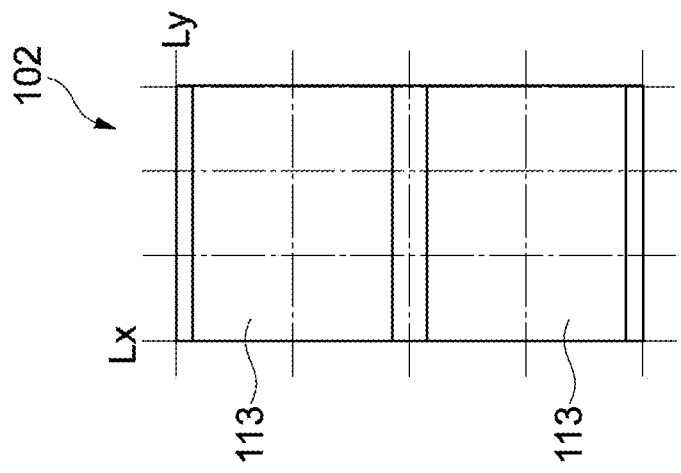
FIG. 6B is a plan view showing a production process of the multi-layer ceramic capacitor.
Figure 6A:
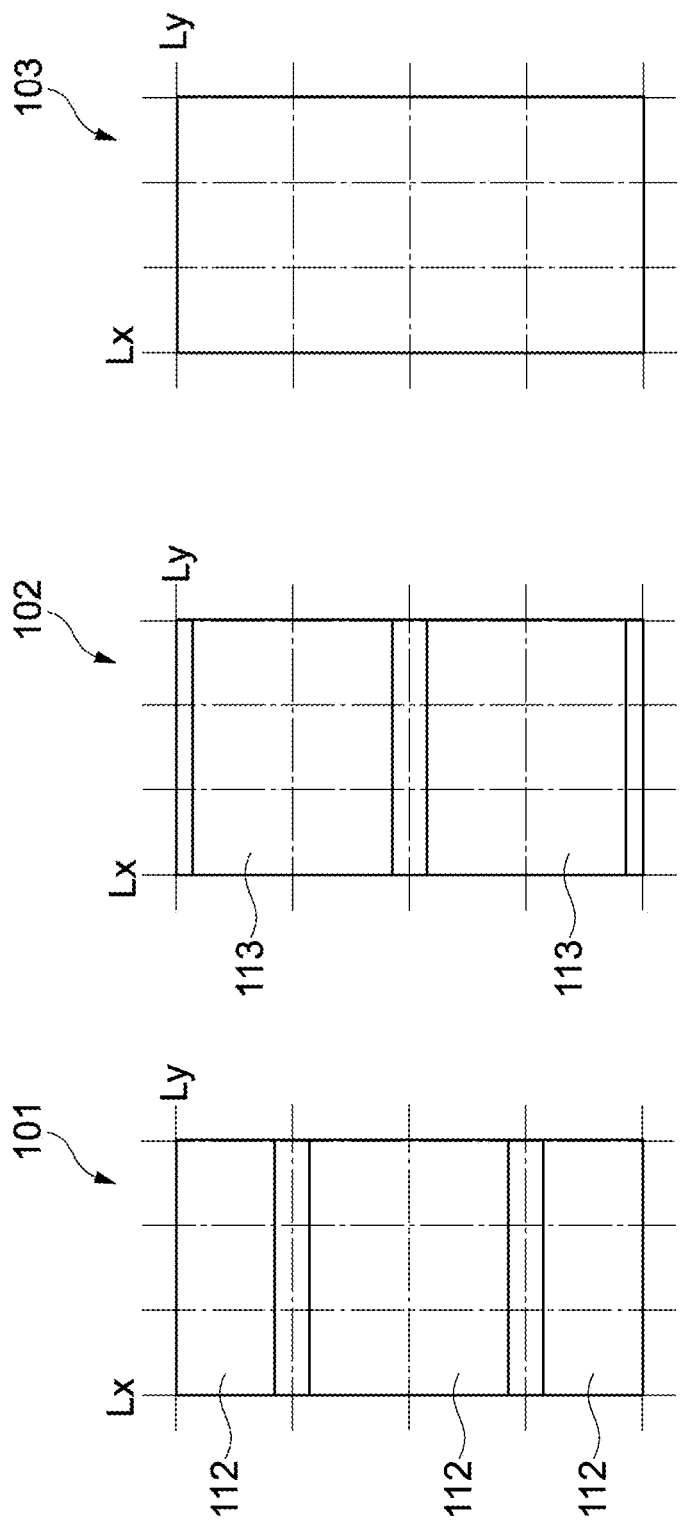
FIG. 6A is a plan view showing a production process of the multi-layer ceramic capacitor.

FIGS. 6A, 6B, and 6C are plan views of the first, second, and third ceramic sheets 101, 102, and 103, respectively. At this stage, the first, second, and third ceramic sheets 101, 102, and 103 are not yet cut into the multi-layer ceramic capacitors 10. FIGS. 6A, 6B, and 6C each show cutting lines Lx and Ly used when the sheets are cut into the multi-layer ceramic capacitors 10. The cutting lines Lx are parallel to the X axis, and the cutting lines Ly are parallel to the Y axis.

As shown in FIGS. 6A, 6B, and 6C, unsintered first internal electrodes 112 corresponding to the first internal electrodes 12 are formed on the first ceramic sheet 101, and unsintered second internal electrodes 113 corresponding to the second internal electrodes 13 are formed on the second ceramic sheet 102. It should be noted that no internal electrodes are formed on the third ceramic sheet 103 corresponding to the cover 19.

The first and second internal electrodes 112 and 113 can be formed using an electrical conductive paste containing nickel (Ni), for example. For formation of the first and second internal electrodes 112 and 113 by use of an electrical conductive paste, a screen printing method or a gravure printing method can be used, for example.

Each of the first and second internal electrodes 112 and 113 is disposed over two areas and extends like a belt in the Y-axis direction. The two areas are adjacent to each other in the X-axis direction and divided by the cutting line Ly. The first internal electrodes 112 are shifted from the second internal electrodes 113 in the X-axis direction by one row including the areas divided by the cutting lines Ly. In other words, the cutting line Ly passing through the center of the first internal electrode 112 passes through an area between the second internal electrodes 113, and the cutting line Ly passing through the center of the second internal electrode 113 passes through an area between the first internal electrodes 112.

2.2 Step S02: Lamination

In Step S02, the first, second, and third ceramic sheets 101, 102, and 103 prepared in Step S01 are laminated, to produce a multi-layer sheet 104.

Figure 7:
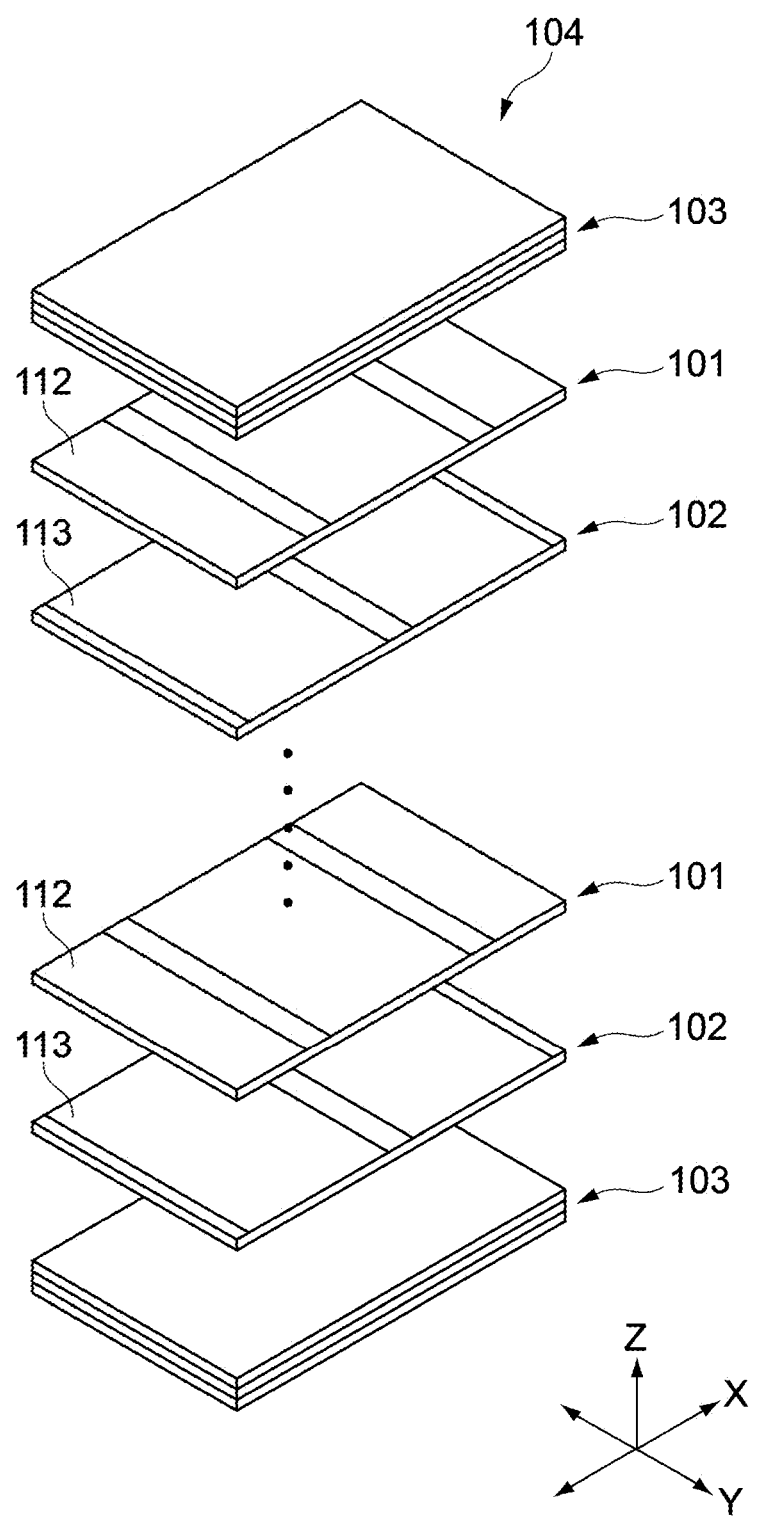
FIG. 7 is a perspective view showing the production process of the multi-layer ceramic capacitor.

FIG. 7 is an exploded perspective view of the multi-layer sheet 104 obtained in Step S02. For the purpose of description, FIG. 7 shows the first, second, and third ceramic sheets 101, 102, and 103 in an exploded manner. In an actual multi-layer sheet 104, however, the first, second, and third ceramic sheets 101, 102, and 103 are pressure-bonded by hydrostatic pressing, uniaxial pressing, or the like for integration. With this configuration, a high-density multi-layer sheet 104 is obtained.

In the multi-layer sheet 104, the first ceramic sheets 101 and the second ceramic sheets 102 that correspond to the capacitance forming unit 18 are alternately laminated in the Z-axis direction.

Further, in the multi-layer sheet 104, the third ceramic sheets 103 corresponding to the covers 19 are laminated on the uppermost and lowermost surfaces of the first and second ceramic sheets 101 and 102 alternately laminated in the Z-axis direction. It should be noted that in the example shown in FIG. 7, three third ceramic sheets 103 are laminated on each of the uppermost and lowermost surfaces of the laminated first and second ceramic sheets 101 and 102, but the number of third ceramic sheets 103 can be changed as appropriate.

2.3 Step S03: Cutting

In Step S03, the multi-layer sheet 104 obtained in Step S02 is cut with a rotary blade, a push-cutting blade, or the like, to produce unsintered multi-layer chips 116.

Figure 8:
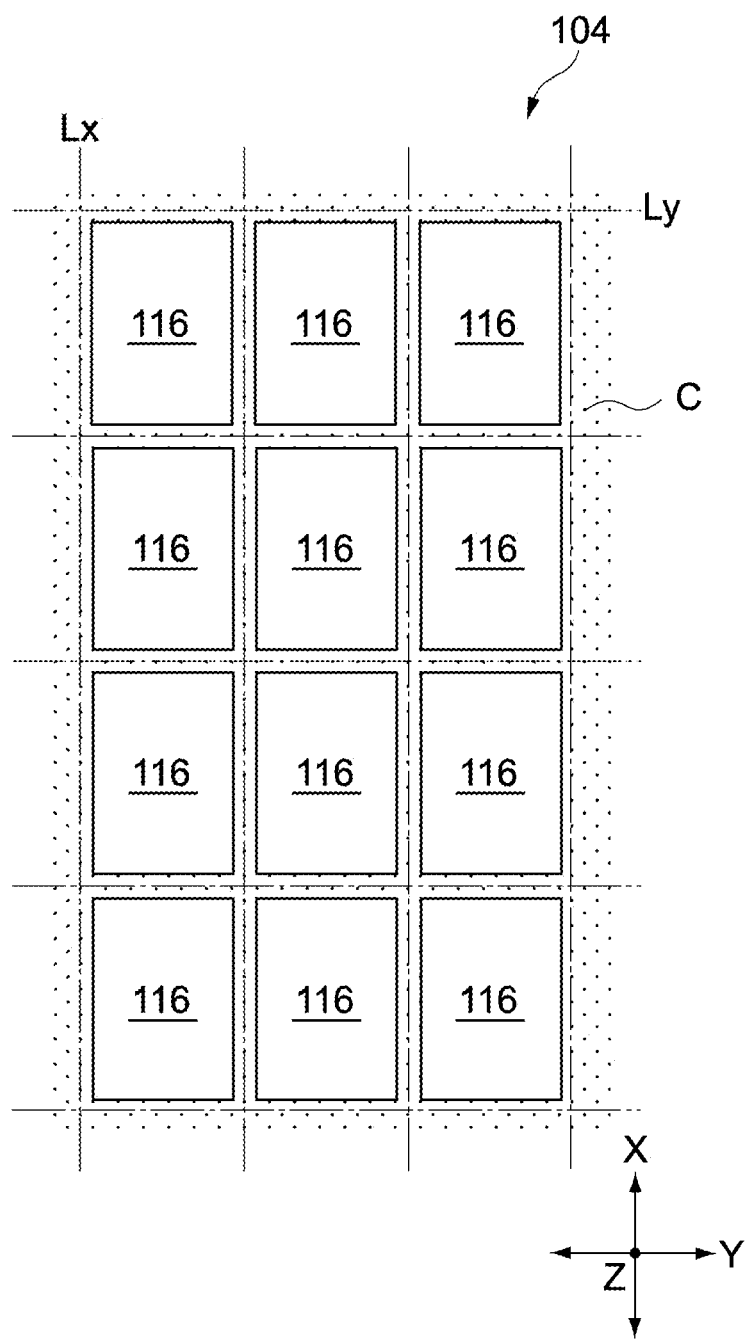
FIG. 8 is a plan view showing the production process of the multi-layer ceramic capacitor.

FIG. 8 is a plan view of the multi-layer sheet 104 after Step S03. The multi-layer sheet 104 is cut along the cutting lines Lx and Ly while being fixed to a holding member C. With this configuration, the multi-layer sheet 104 is singulated, so that the multi-layer chips 116 are obtained. At that time, the holding member C is not cut, and thus the multi-layer chips 116 are connected via the holding member C.

Figure 9:
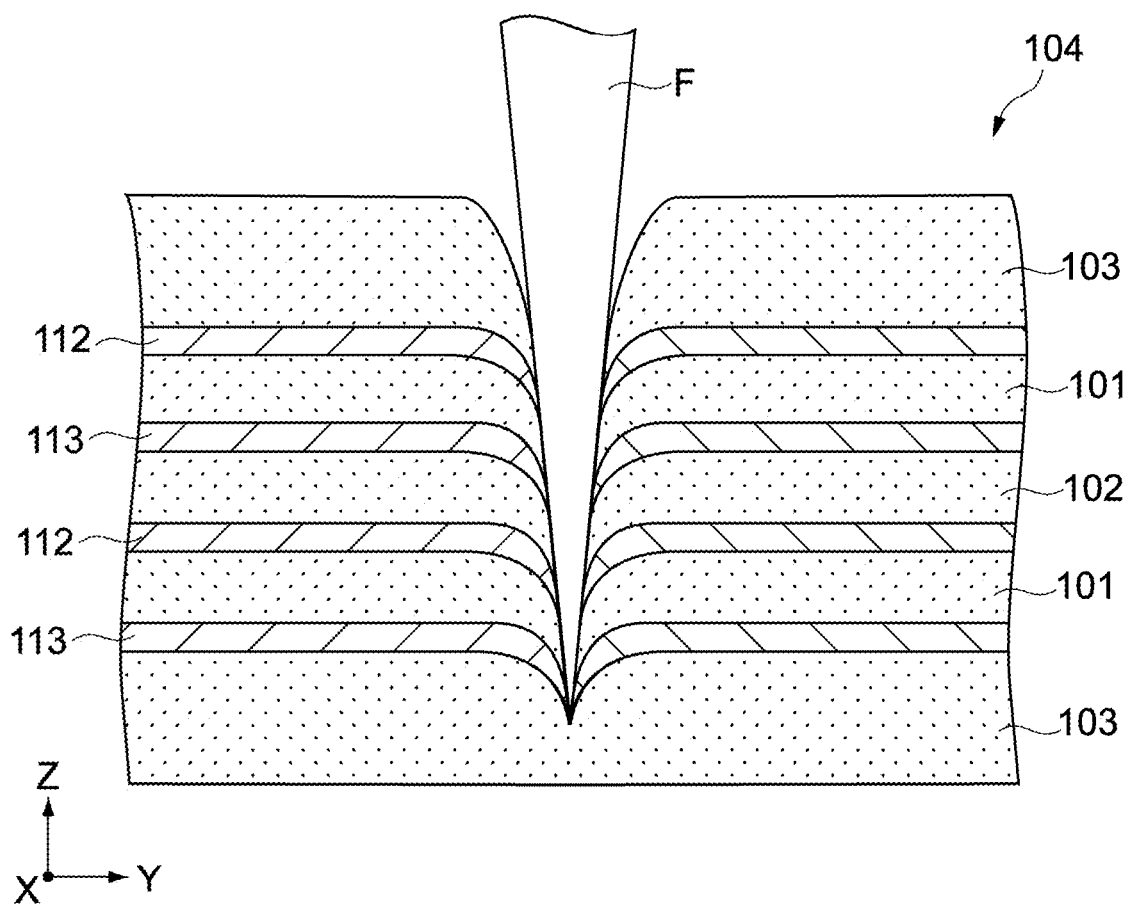
FIG. 9 is a cross-sectional view showing the production process of the multi-layer ceramic capacitor.

FIG. 9 is a view showing a state where the multi-layer sheet 104 is being cut. In FIG. 9, for the purpose of description, the number of first and second internal electrodes 112 and 113 is four in total, and the number of first, second, and third ceramic sheets 101, 102, and 103 is five in total.

When the multi-layer sheet 104 is cut with a cutting blade F such as a push-cutting blade, the cutting blade F that is cutting the multi-layer sheet 104 may drag the first and second internal electrodes 112 and 113, and the ends of the first and second internal electrodes 112 and 113 may be extended in the Z-axis direction as shown in FIG. 9. As a result, on side surfaces S3 and S4 of the multi-layer chip 116, the first and second internal electrodes 112 and 113 come into contact with each other via the extended portions thereof in some cases.

However, as shown in FIG. 4, the first and second internal electrodes 112 and 113 according to this embodiment include the oxidized areas E that are successfully formed at the ends thereof by sintering, which will be described later. Therefore, even when the first and second internal electrodes 112 and 113 are extended at the time of cutting the multi-layer sheet 104, and the ends of the first and second internal electrodes 112 and 113 come into contact with each other via the extended portions, a short circuit failure between the first and second internal electrodes 112 and 113 is suppressed.

Figure 10:
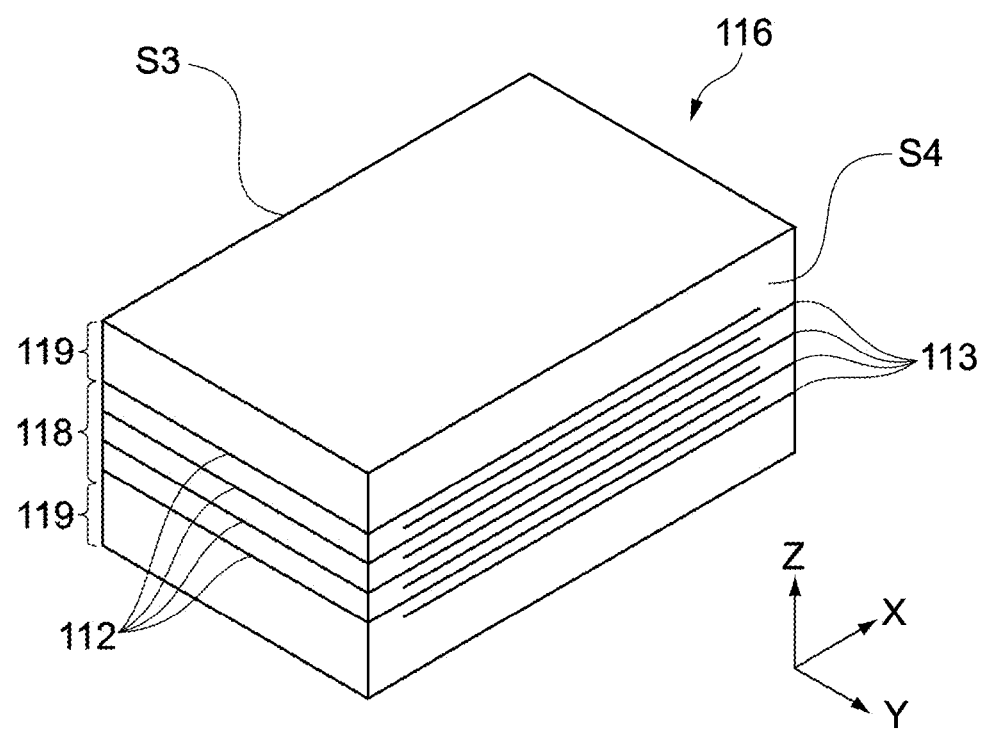
FIG. 10 is a perspective view showing the production process of the multi-layer ceramic capacitor.

FIG. 10 is a perspective view of the multi-layer chip 116 obtained in Step S03. The multi-layer chip 116 includes a capacitance forming unit 118 and covers 119 that are unsintered. In the multi-layer chip 116, the unsintered first and second internal electrodes 112 and 113 are exposed to the cut surfaces, i.e., both the side surfaces S3 and S4 oriented in the Y-axis direction.

2.4 Step S04: Formation of Side Margins

In Step S04, unsintered side margins 117 are provided to the side surfaces S3 and S4 of the multi-layer chip 116, to produce an unsintered body 111.

In Step S04, in order to provide the side margins 117 to both the side surfaces S3 and S4 of the multi-layer chip 116, the orientation of the multi-layer chip 116 is changed as appropriate by replacement of a holding member such as a tape, for example.

In particular, in Step S04, the side margins 117 are provided to both the side surfaces S3 and S4 that are oriented in the Y-axis direction, both the side surfaces S3 and S4 being the cut surfaces of the multi-layer chip 116 in Step S03. For that reason, in Step S04, it is desirable to previously detach the multi-layer chips 116 from the holding member C and rotate the multi-layer chips 116 by 90 degrees.

Figure 11:
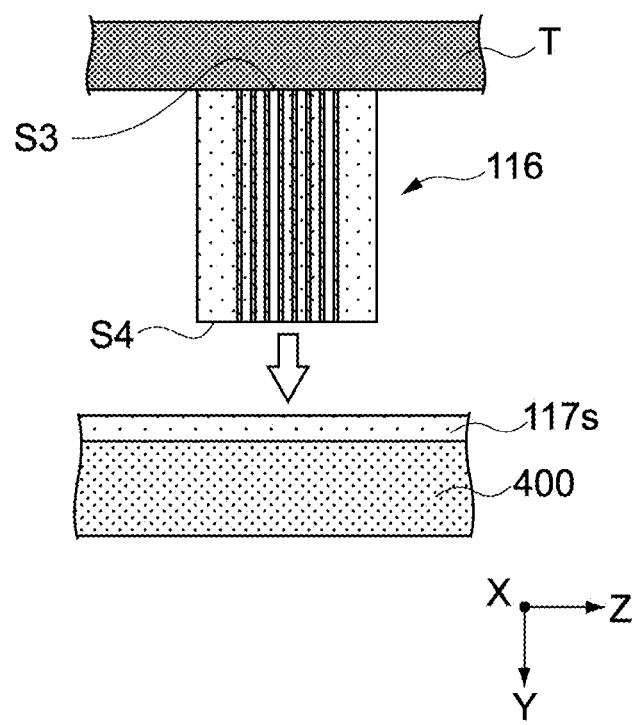
FIG. 11 is a schematic view showing the production process of the multi-layer ceramic capacitor.
Figure 12:
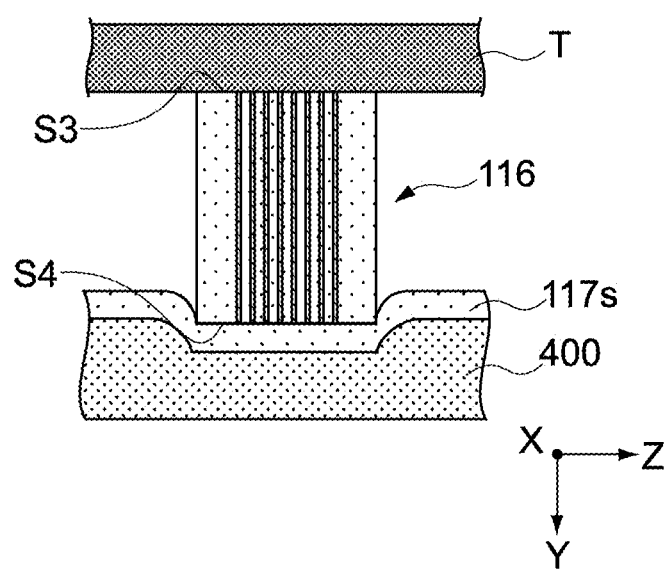
FIG. 12 is a schematic view showing the production process of the multi-layer ceramic capacitor.
Figure 13:
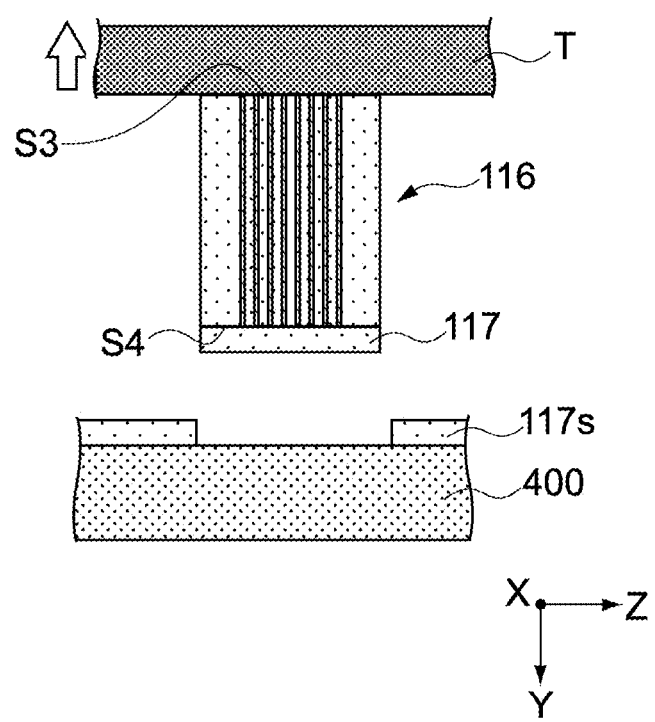
FIG. 13 is a schematic view showing the production process of the multi-layer ceramic capacitor.

FIGS. 11 to 13 are schematic views showing the process of Step S04 and showing a state where a side margin sheet 117s is punched out by the multi-layer chip 116. Hereinafter, the process of Step S04 will be described step by step.

First, the side margin sheet 117s for forming the side margins 117 is prepared. The side margin sheet 117s is configured as an unsintered dielectric green sheet mainly made of insulating ceramics, similar to the first, second, and third ceramic sheets 101, 102, and 103 prepared in Step S01.

The side margin sheet 117s is formed into a sheet by using, for example, a roll coater or a doctor blade. Further, the side margin sheet 117s is adjusted to have a small thickness in the Y-axis direction.

Next, as shown in FIG. 11, the side margin sheet 117s is disposed on a flat plate-like elastic body 400. The multi-layer chip 116 is then disposed such that the side surface S4 of the multi-layer chip 116 faces the side margin sheet 117s in the Y-axis direction. In Step S04, the orientation of the multi-layer chip 116 is changed as appropriate by the step of replacing the holding member such as a tape, and the side surface S3 of the multi-layer chip 116 is thus held by a tape T, as shown in FIG. 11.

Subsequently, the multi-layer chip 116 is moved toward the side margin sheet 117s in the Y-axis direction, and the side surface S4 of the multi-layer chip 116 is thus pressed against the side margin sheet 117s.

In this case, as shown in FIG. 12, the multi-layer chip 116 bites into the elastic body 400 together with the side margin sheet 117s. Accordingly, the elastic body 400 is raised in the Y-axis direction and pushes up the side margin sheet 117s by a pressing force in the Y-axis direction that is applied from the multi-layer chip 116 to the elastic body 400.

This causes a shear force applied from the elastic body 400 to the side margin sheet 117s, and the side margin sheet 117s facing the side surface S4 in the Y-axis direction is cut off. This side margin sheet 117s is then attached to the side surface S4.

Next, when the multi-layer chip 116 is moved in the Y-axis direction so as to be separated from the elastic body 400, as shown in FIG. 13, the side margin sheet 117s attached to the side surface S4 only is separated from the elastic body 400. Thus, the side margin 117 is formed on the side surface S4 of the multi-layer chip 116.

Here, conditions for punching out when the side surfaces S3 and S4 of the multi-layer chip 116 punch out the side margin sheet 117s are adjusted. This can improve compactness of ceramics of the side margins 17 after subjected to sintering, which will be described later.

Specifically, a speed at which the multi-layer chip 116 punches out the side margin sheet 117s, and a punching-out pressure applied to the side margin sheet 117s by the multi-layer chip 116 are adjusted. This can improve compactness of ceramics of the side margins 17 after subjected to sintering, which will be described later.

Subsequently, the multi-layer chip 116 held by the tape T is held by another tape. Thus, the side surface S3 of the multi-layer chip 116 is exposed to face the side margin sheet 117s in the Y-axis direction. Through a step similar to the above-mentioned step of forming the side margin 117 on the side surface S4, the side margin 117 is formed also on the side surface S3.

This provides an unsintered body 111 including the side margins 117 formed on both the side surfaces S3 and S4 of the multi-layer chip 116. In this embodiment, also when the unsintered body 111 is subjected to hydrostatic pressing or the like, compactness of ceramics of the side margins 17 after subjected to sintering is improved.

Figure 14:
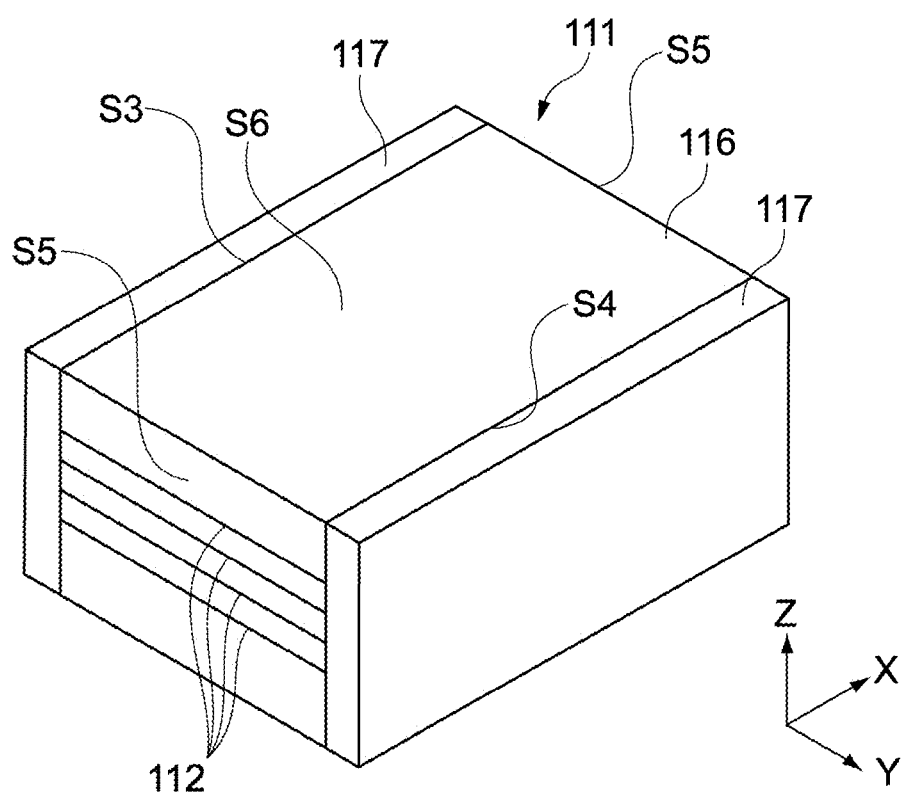
FIG. 14 is a perspective view showing the production process of the multi-layer ceramic capacitor.

FIG. 14 is a perspective view of the unsintered body 111 obtained in Step S04.

The unsintered body 111 has a configuration in which the ends of the first and second internal electrodes 112 and 113, which are exposed to the side surfaces S3 and S4, are covered with the side margins 117, and the ends of the first and second internal electrodes 112 and 113 in the X-axis direction are exposed to end surfaces S5 in the X-axis direction.

Figure 15:
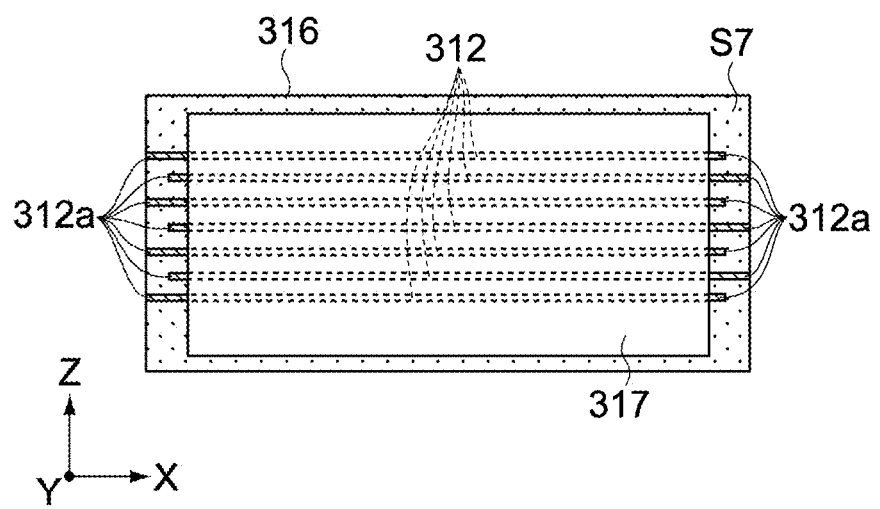
FIG. 15 is a side view of a body of a multi-layer ceramic capacitor in the related art.

FIG. 15 is a view showing a production process of a body of a multi-layer ceramic capacitor in the related art and is also a side view of the body. With reference to FIG. 15, an action caused by adjusting the thickness of the side margin sheet 117s will be described.

In the production process of the multi-layer ceramic capacitor in the related art, when a side margin sheet for forming the side margins is thick, the sectility of the side margin sheet when a multi-layer chip 316 punches out the side margin sheet may be poor.

For that reason, in a side surface S7 of the multi-layer chip 316 on which a side margin 317 is formed by punching out of the side margin sheet, as shown in FIG. 15, ends 312a of internal electrodes 312 may be exposed.

When the ends 312a of the internal electrodes 312 are not covered with the side margin 317 having insulation properties and are exposed to the side surface S7, if foreign substances or the like adhere to the side surface S7, which is not covered with the side margin 317, in the production process, electrical conduction occurs between the ends 312a of the internal electrodes 312 via those foreign substances in the multi-layer ceramic capacitor after subjected to sintering, and a short circuit failure may be caused.

Further, since the side margin 317 does not cover the ends 312a of the internal electrodes 312, the ends 312a are difficult to be protected from moisture or the like. Thus, moisture resistance of the multi-layer ceramic capacitor after subjected to sintering may also be reduced.

In contrast to the above, the thickness of the side margin sheet 117s according to this embodiment is adjusted to be small. This improves sectility of the side margin sheet 117s when punched out by the multi-layer chip 116, compared with the past side margin sheet.

Consequently, as shown in FIG. 14, the unsintered body 111, which is formed by punching out of the side margin sheet 117s by the multi-layer chip 116, has a configuration in which the ends of the first and second internal electrodes 112 and 113 are not exposed to the side surfaces S3 and S4.

Therefore, a short circuit failure and reduction in moisture resistance of the multi-layer ceramic capacitor 10, which result from the exposure of the ends of the first and second internal electrodes 112 and 113 to the side surfaces S3 and S4, is suppressed.

It should be noted that a method of forming the side margins 117 on both the side surfaces S3 and S4 of the multi-layer chip 116 is not limited to the above method of punching out the side margin sheet 117s.

For example, the side margin sheets 117s previously cut may be attached to both the side surfaces S3 and S4 of the multi-layer chip 116, to form the side margins 117.

Alternatively, by a dip method of immersing both the side surfaces S3 and S4 of the multi-layer chip 116 into a paste material made of ceramics and pulling the side surfaces S3 and S4 out of the paste material, the side margins 117 may be formed on both the side surfaces S3 and S4 of the multi-layer chip 116.

2.5 Step S05: Barrel Polishing

In Step S05, barrel polishing is performed on the unsintered body 111 obtained in Step S04, to chamfer the body 111.

In Step S04 described above, the sheet-shaped side margins 117 are formed on both the side surfaces S3 and S4 of the multi-layer chip 116, and thus the unsintered body 111 is formed. As a result, as shown in FIG. 14, the body 111 includes ridges (where two surfaces intersect with each other) and corners (where three surfaces intersect with one another). The ridges and the corners connect the surfaces of the body 1 to one another.

When the body 111 includes the ridges and the corners, due to collision of the bodies 111 with one another in the production process, chipping or cracking is generated in the bodies 111. Therefore, in order to suppress generation of such chipping or cracking, the ridges and the corners of the body 111 are chamfered.

For a processing method of chamfering the ridges and the corners of the body 111, barrel polishing is effective in terms of improvement in production efficiency. The barrel polishing can be executed by, for example, putting the unsintered bodies 111, a polishing medium, and liquid into a barrel container and imparting rotational motions or vibrations to the barrel container.

Figure 16:
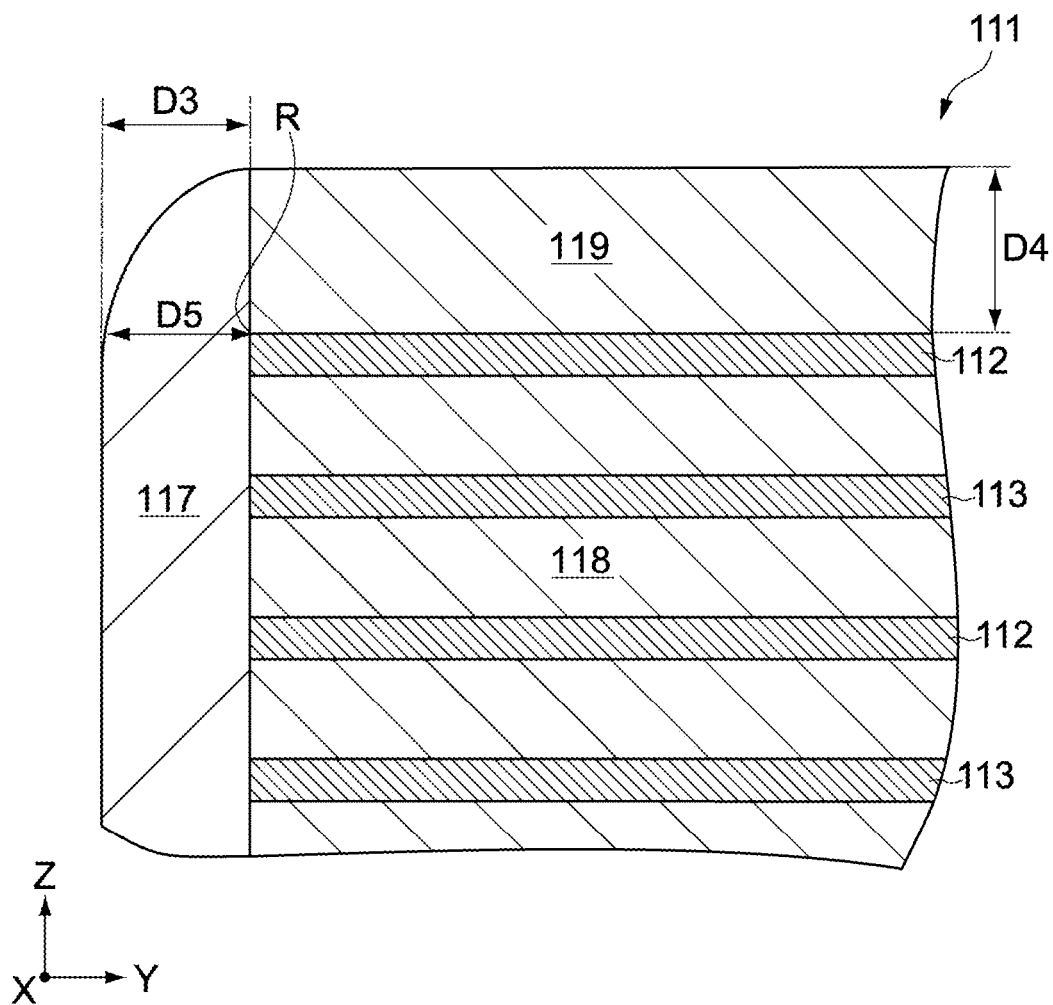
FIG. 16 is an enlarged cross-sectional view showing the production process of the multi-layer ceramic capacitor.

FIG. 16 is an enlarged cross-sectional view of the unsintered body 111 after subjected to the barrel polishing and is also an enlarged view of the vicinity of an ridge R of the capacitance forming unit 118.

In general, when ridges and corners of an unsintered body including a multi-layer chip and side margins are chamfered by barrel polishing or the like, the thickness of the side margin is likely to be excessively small in the vicinity of the ridge of a capacitance forming unit.

This causes moisture or the like to easily infiltrate into the multi-layer chip from the outside via the excessively thin portion of the side margin and may reduce moisture resistance of the multi-layer ceramic capacitor.

In this regard, in this embodiment, in the body 111, the thickness of the side margin sheet 117s is adjusted such that a dimension D4 of the cover 119 in the Z-axis direction is equal to or larger than a dimension D3 of the side margin 117 in the Y-axis direction. This prevents a dimension D5 of the side margin 117 in the vicinity of the ridge R of the capacitance forming unit 118 from being excessively small in the body 111 after subjected to the barrel polishing.

In Step S05, in the body 111 after subjected to the barrel polishing, it is desirable to set the dimension D3 of the side margin 117 to be nearly equal to the dimension D5 of the side margin 117 in the vicinity of the ridge R, in terms of ensuring the moisture resistance of the multi-layer ceramic capacitor 10. Specifically, in the body 111 after subjected to the barrel polishing, the dimensions D3 and D5 of the side margin 117 are desirably 10 μm or more.

Further, in Step S05, in the body 111 after subjected to the barrel polishing, it is desirable to set the dimension D4 of the cover 119 to be equal to or larger than the dimension D3 of the side margin 117. With this configuration, the dimension of the cover 19 in the Z-axis direction after subjected to sintering, which will be described later, is equal to or larger than the dimension of the side margin 17 in the Y-axis direction.

With this configuration, moisture or the like is difficult to infiltrate into the multi-layer chip 16 from the outside via the side margin 17 in the vicinity of the ridge R of the capacitance forming unit 18, and reduction in moisture resistance of the multi-layer ceramic capacitor 10 can be suppressed.

2.6 Step S06: Sintering

In Step S06, the unsintered body 111 obtained in Step S05 is sintered to produce the body 11 of the multi-layer ceramic capacitor 10 shown in FIGS. 1 to 3. In other words, in Step S06, the first internal electrodes 112 and the second internal electrodes 113 respectively become the first internal electrodes 12 and the second internal electrodes 13, the multi-layer chip 116 becomes the multi-layer unit 16, and the side margins 117 become the side margins 17.

In Step S04 described above, a punching-out pressure, a speed, or the like at which the multi-layer chip 116 punches out the side margin sheet 117s is adjusted, hydrostatic pressing is performed on the body 1, or the content of glass or the like contained in the side margin sheet 117s is adjusted. Thus, the side margins 17 subjected to sintering have the porosity of 1% or less.

A sintering temperature for the body 111 in Step S06 can be determined on the basis of a sintering temperature for the multi-layer chip 116 and the side margins 117. For example, when a barium titanate (BaTiO$_3$) based material is used as the ceramics, the sintering temperature for the body 111 can be set to approximately 1,000 to 1,300° C. Further, sintering can be performed in a reduction atmosphere or a low-oxygen partial pressure atmosphere, for example. In this embodiment, sintering is performed in a low-oxygen partial pressure atmosphere (4.0*10$^{-9}$ ppm).

Here, in this embodiment, the thickness of the side margin 117 in the Y-axis direction in the body 111 is set to 20 μm or less. Thus, at the time of sintering, oxygen is easily supplied to the first and second internal electrodes 112 and 113 via the side margins 117, and the oxidized areas E are successfully formed at the ends of the first and second internal electrodes 112 and 113.

Therefore, even when foreign substances or the like adhere to the side surfaces S3 and S4 of the multi-layer chip 116 in the production process, in which the ends of the first and second internal electrodes 112 and 113 are exposed, electrical conduction between the first internal electrodes 12 and the second internal electrodes 13 via the foreign substances or the like on the side surfaces S1 and S2 of the sintered body 11 is suppressed. Consequently, a short circuit failure or an IR failure between the first internal electrodes 12 and the second internal electrodes 13 is effectively suppressed.

2.7 Step S07: Formation of External Electrodes

In Step S07, the first external electrode 14 and the second external electrode 15 are formed on the body 11 obtained in Step S06, to produce the multi-layer ceramic capacitor 10 shown in FIGS. 1 to 3.

In Step S07, first, an unsintered electrode material is applied so as to cover one of the end surfaces of the body 11 and then applied so as to cover the other one of the end surfaces of the body 11, the end surfaces being oriented in the X-axis direction. The applied unsintered electrode materials are subjected to baking in a reduction atmosphere or a low-oxygen partial pressure atmosphere, for example, to form base films on the body 11. On the base films baked onto the body 11, intermediate films and surface films are formed by plating such as electrolytic plating. Thus, the first external electrode 14 and the second external electrode 15 are completed.

It should be noted that part of the processing in Step S07 described above may be performed before Step S06. For example, before Step S06, the unsintered electrode material may be applied to both the end surfaces S5 of the unsintered body 111 that are oriented in the X-axis direction, and in Step S06, the unsintered body 111 may be sintered and, simultaneously, the unsintered electrode material may be baked to form base films of the first external electrode 14 and the second external electrode 15.

2.8 Modified Example

The method of producing the multi-layer ceramic capacitor 10 is not limited to the production method described above, and the production steps may be changed or added as appropriate.

For example, the unsintered body 111 may be subjected to debinder processing, to remove binder components or solvent components from the unsintered body 111.

Examples of the method of performing the debinder processing on the unsintered body 111 include a method of performing heat treatment on the body 111 in an electric furnace in a reduction atmosphere at a temperature of 350 to 600° C. for one to eight hours, the body 111 being housed in a sheath made of alumina. In this case, a rate of temperature rise of the electric furnace can be set to, for example, 1 to 10° C./min.

Further, in this embodiment, ceramics may be deposited on the side margins 117 subjected to the debinder processing. As a result, ceramics is filled into voids of ceramics particles that are generated by the debinding, and compactness of ceramics of the side margins 17 after subjected to sintering is improved.

For the ceramics to be deposited on the side margins 117 subjected to the debinder processing, ceramics whose type of composition system is similar to that of the insulating ceramics, which is a main component of the side margin sheet 117s, is typically employed.

For the method of depositing ceramics on the side margins 117 subjected to the debinder processing, for example, a spray dry method of spraying powder of ceramics on the side margins 117, or a sputtering method or a vacuum deposition method of causing particles forming the ceramics to adhere to the side margins 117, or the like is employed.

3. EXAMPLES

Hereinafter, Examples of the present invention will be described.

3.1 Production of Unsintered Body 200 samples of unsintered bodies according to each of Examples 1 to 8 and Comparative Examples 1 to 6 were produced by the production method described above. The samples according to Examples 1 to 8 and Comparative Examples 1 to 6 were produced under common production conditions except for the thickness of the side margin and the compactness of ceramics forming the side margin.

Example 1

A sample according to Example 1 includes the side margin 117 having a thickness of 2 μm.

Example 2

A sample according to Example 2 includes the side margin 117 having a thickness of 5 μm.

Example 3

A sample according to Example 3 is a sample in which the side margin 117 is formed by using the side margin sheet 117s having a thickness of 9 μm.

Example 4

A sample according to Example 4 includes the side margin 117 having a thickness of 10 μm.

Example 5

A sample according to Example 5 includes the side margin 117 having a thickness of 15 μm.

Example 6

A sample according to Example 6 is a sample in which the side margin 117 is formed by using the side margin sheet 117s having a thickness of 19 μm.

Example 7

A sample according to Example 7 includes the side margin 117 having a thickness of 20 μm.

Example 8

A sample according to Example 8 includes the side margin 117 having a thickness of 25 μm.

Comparative Example 1

A sample according to Comparative Example 1 includes a side margin having a thickness of 2 μm.

Comparative Example 2

A sample according to Comparative Example 2 includes a side margin having a thickness of 5 μm.

Comparative Example 3

A sample according to Comparative Example 3 includes a side margin having a thickness of 10 μm.

Comparative Example 4

A sample according to Comparative Example 4 includes a side margin having a thickness of 15 μm.

Comparative Example 5

A sample according to Comparative Example 5 includes a side margin having a thickness of 20 μm.

Comparative Example 6

A sample according to Comparative Example 6 includes a side margin having a thickness of 25 μm.

3.2 Evaluation of Unsintered Body 3.2.1 Detection of Sample with Peeled-Off Side Margin In the 200 samples according to each of Examples 2, 4, 5, 7, and 8, whether samples with the side margin 117 peeled off from the multi-layer chip 116 are detectable or not was evaluated using an optical microscope. Table 1 shows results of the evaluation.

A "peeling length" shown in Table 1 is a dimension of a gap between the multi-layer chip 116 and the side margin 117.

Referring to Table 1, it is found in Examples 5, 7, and 8 that samples having a peeling length of 50 μm or more are detectable, but samples having a peeling length less than 50 μm are undetectable. Meanwhile, it was confirmed in Examples 2 and 4 that any sample is detectable irrespective of the peeling length.

From the above, it was experimentally confirmed that when the thickness of the side margin in the unsintered body 111 is set to 10 μm or less, samples having a gap between the multi-layer chip 116 and the side margin 117 are detectable irrespective of the peeling length.

Figure 17:
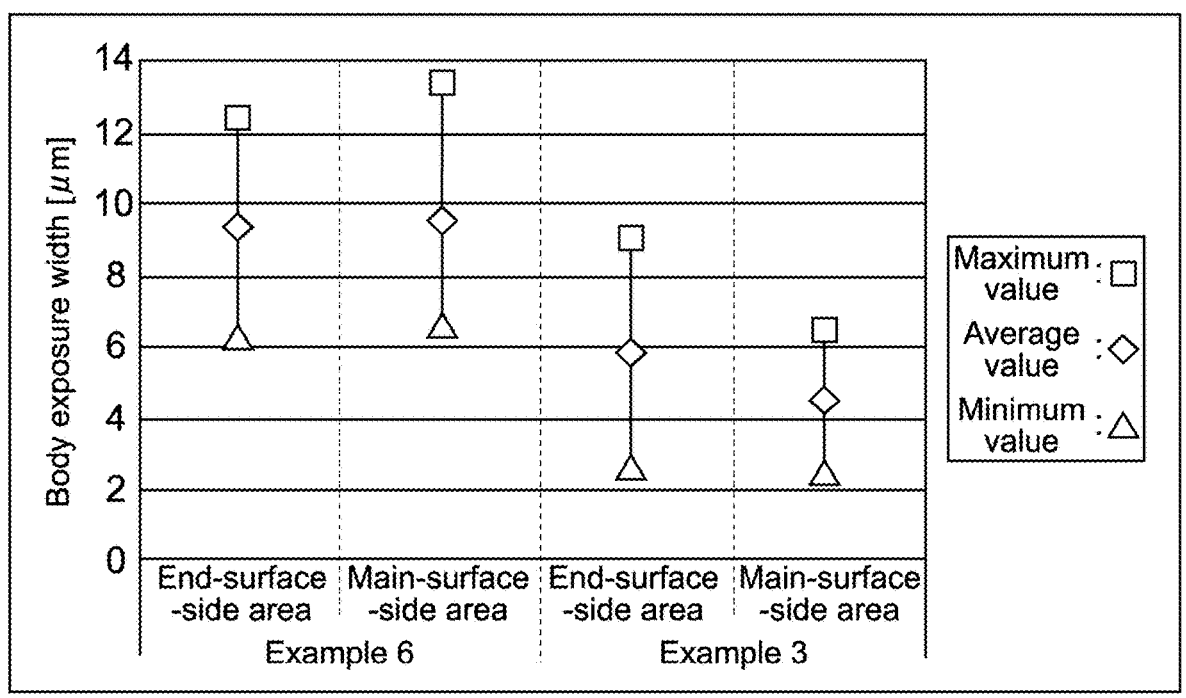
FIG. 17 is a graph showing evaluation results of multi-layer ceramic capacitors according to Examples of the present invention.

3.2.2 Measurement of Body Exposure Width 20 samples were selected from the 200 samples according to each of Examples 3 and 6, and a body exposure width of each of the 20 selected samples was measured. FIG. 17 is a graph of results of the measurement.

It should be noted that "a body exposure width of an end-surface-side area" shown in FIG. 17 is a dimension in the X-axis direction of an area between the side margin 117 and the end surface S5 oriented in the X-axis direction, in the side surfaces S3 and S4 of the multi-layer chip 116 including the side margins 117.

Further, "a body exposure width of a main-surface-side area" is a dimension in the Z-axis direction of an area between the side margin 117 and a main surface S6 oriented in the Z-axis direction, in the side surfaces S3 and S4 of the multi-layer chip 116 including the side margins 117 (see FIG. 14).

Referring to FIG. 17, it is found that Example 3 has an averagely smaller body exposure width in each of the end-surface-side area and the main-surface-side area than Example 6. From those results, it was experimentally confirmed that when the thickness of the side margin sheet 117s is made small, the body exposure width in each of the end-surface-side area and the main-surface-side area can be reduced.

3.3 Production of Multi-Layer Ceramic Capacitor

Using the unsintered bodies according to Examples 1, 2, 4, 5, 7, and 8 and Comparative Examples 1 to 6, samples of multi-layer ceramic capacitors according to Examples 1, 2, 4, 5, 7, and 8 and Comparative Examples 1 to 6 were produced by the production method described above.

3.4 Evaluation of Multi-Layer Ceramic Capacitor 3.4.1 Evaluation of Moisture Resistance Moisture resistance was evaluated for the samples of the multi-layer ceramic capacitors according to Examples 1, 2, 4, 5, 7, and 8 and Comparative Examples 1 to 6.

Specifically, a hygroscopicity test was performed, in which 200 samples of each of Examples 1, 2, 4, 5, 7, and 8 and Comparative Examples 1 to 6 are held at a temperature of 45° C. and a humidity of 95% under application of a rated voltage of 10 V. For each of the samples subjected to the hygroscopicity test, an electric resistance value was measured, and samples whose electric resistance value is less

TABLE 1

| Sample | Thickness of side margin [μm] | Peeling length: less than 10 μm | Peeling length: 10 to less than 50 μm | Peeling length: 50 to less than 100 μm | Peeling length: 100 μm or more |
|---|---|---|---|---|---|
| Example 2 | 5 | Detectable | Detectable | Detectable | Detectable |
| Example 4 | 10 | Detectable | Detectable | Detectable | Detectable |
| Example 5 | 15 | Undetectable | Detectable | Detectable | Detectable |
| Example 7 | 20 | Undetectable | Undetectable | Detectable | Detectable |
| Example 8 | 25 | Undetectable | Undetectable | Detectable | Detectable | than 10 MO were determined as failure. Table 2 shows the thickness of the side margin, the porosity thereof, and the number of failures of the samples in each Example.

TABLE 2

| Sample | Thickness of side margin [μm] | Porosity of side margin | Number of failures [out of 200 pcs] |
| --- | --- | --- | --- |
| Example 1 | 2 | 1% or less | 5 |
| Example 2 | 5 | 1% or less | 0 |
| Example 4 | 10 | 1% or less | 0 |
| Example 5 | 15 | 1% or less | 0 |
| Example 7 | 20 | 1% or less | 0 |
| Example 8 | 25 | 1% or less | 0 |
| Comparative Example 1 | 2 | Larger than 1% | 10 |
| Comparative Example 2 | 5 | Larger than 1% | 5 |
| Comparative Example 3 | 10 | Larger than 1% | 3 |
| Comparative Example 4 | 15 | Larger than 1% | 2 |
| Comparative Example 5 | 20 | Larger than 1% | 0 |
| Comparative Example 6 | 25 | Larger than 1% | 0 |

Referring to Table 2, while faulty samples were not observed in the samples according to Comparative Examples 5 and 6, faulty samples were observed in the samples according to Comparative Examples 1 to 4. The samples according to Comparative Examples 1 to 6 have the porosity larger than 1%.

A cause of failures observed in the samples according to Comparative Examples 1 to 4 may be due to infiltration of moisture into the multi-layer chip from the outside via the side margin, because the thickness of the side margin is relatively small and the number of pores included in the side margin is large.

From those results, it was confirmed that when the porosity of the side margin is larger than 1% and when the thickness of the side margin is set to 15 μm or less, it is difficult to ensure the moisture resistance of the multi-layer ceramic capacitor.

Meanwhile, in the samples according to Examples 1, 2, 4, 5, 7, and 8, faulty samples were observed in the samples according to Example 1, but faulty samples were not observed in the samples according to Examples 2, 4, 5, 7, and 8. The samples according to Examples 1, 2, 4, 5, 7, and 8 have the porosity of 1% or less.

From those results, it was confirmed that setting the porosity of the side margin 17 to 1% or less ensures the moisture resistance of the multi-layer ceramic capacitor 10 even when the thickness of the side margin 17 is 15 μm or less. It was also confirmed that when the porosity of the side margin 17 is 1% or less and when the thickness thereof is 5 μm or more, the moisture resistance of the multi-layer ceramic capacitor 10 is more effectively ensured.

3.4.2 Calculation of IR Failure Rate

An IR failure rate was calculated for the samples according to Examples 1, 2, 4, 5, 7, and 8. In this case, samples whose IR failure rate is 10% or less were determined to be approved.

Figure 18:
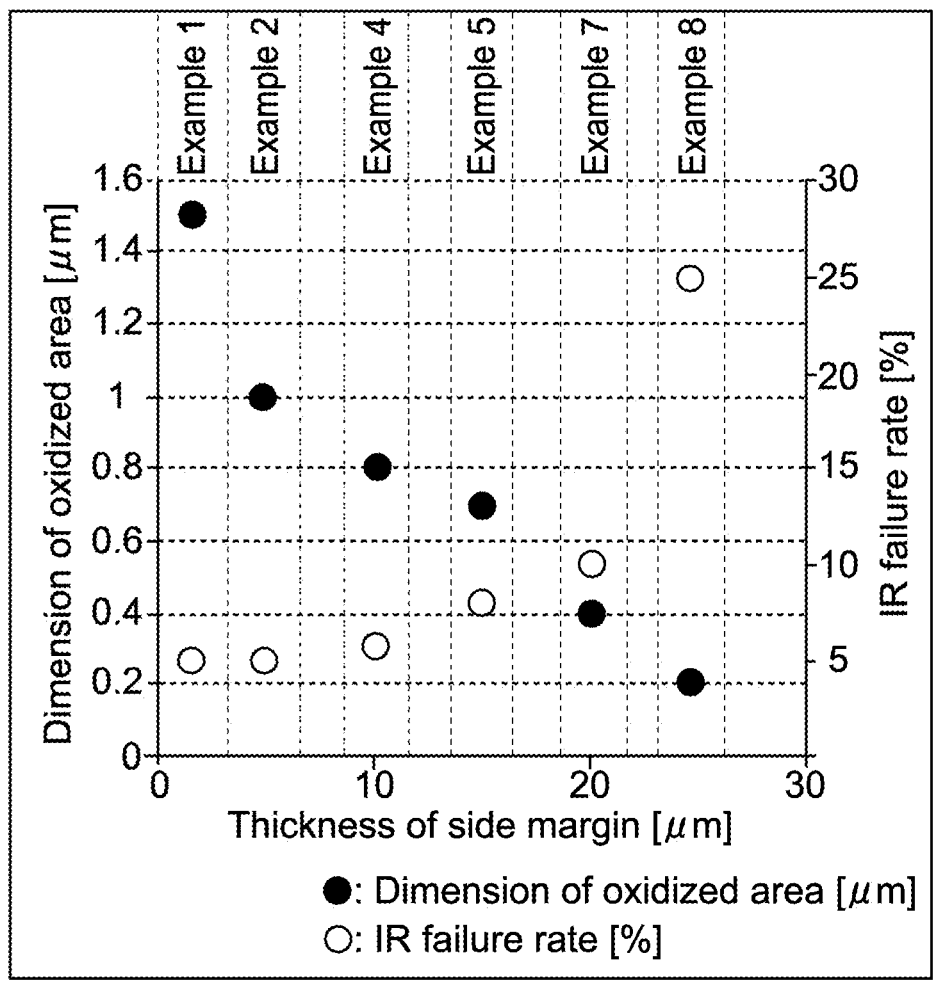
FIG. 18 is a graph showing evaluation results of the multi-layer ceramic capacitors.

Table 3 and FIG. 18 are respectively a table and a graph each showing the thickness of the side margin 117 in the samples of the unsintered bodies 111 according to Examples 1, 2, 4, 5, 7, and 8, the dimension D2 of the oxidized area E in the samples of the multi-layer ceramic capacitors 10 according to Examples 1, 2, 4, 5, 7, and 8, and the IR failure rate.

The dimension D2 of the oxidized area shown in Table 3 and FIG. 18 is an average value of the dimensions D2 of the oxidized areas E formed in the 200 samples according to each of Examples 1, 2, 4, 5, 7, and 8.

Further, the IR failure rate shown in Table 3 and FIG. 18 represents a proportion of samples having an IR failure in the 200 samples according to each of Examples 1, 2, 4, 5, 7, and 8. The above-mentioned samples having an IR failure are samples in which a CR product is less than 1 MΩ under a condition where a rated voltage of 6 V is applied.

TABLE 3

| Sample | Thickness of side margin [μm] | Dimension of oxidized area [μm] | IR failure rate [%] |
| --- | --- | --- | --- |
| Example 1 | 2 | 1.5 | 5 |
| Example 2 | 5 | 1.0 | 5 |
| Example 4 | 10 | 0.8 | 6 |
| Example 5 | 15 | 0.7 | 8 |
| Example 7 | 20 | 0.4 | 10 |
| Example 8 | 25 | 0.2 | 25 |

Referring to Table 3 and FIG. 18, while the samples according to Example 8 had the IR failure rate larger than 10%, the samples according to Examples 1, 2, 4, 5, and 7 had the IR failure rate of 10% or less.

A cause of the IR failure rate, which is larger than 10%, of the samples according to Example 8 may be due to reduction in insulation resistance between the first and second internal electrodes 112 and 113. This is because the thickness of the side margin 117 of the unsintered body 111 is larger than 20 μm, and thus oxidation of the ends of the first and second internal electrodes 112 and 113 does not progress and the oxidized areas are not sufficiently formed at the ends of the first and second internal electrodes 112 and 113.

From those results, it was experimentally confirmed that when the thickness of the side margin 117 is set to 20 μm or less, the dimension D2 of the oxidized area E, which is 0.4 μm or more, is ensured, and the IR failure in the multi-layer ceramic capacitor 10 can thus be suppressed.

4. OTHER EMBODIMENTS

While the embodiment of the present invention has been described, the present invention is not limited to the embodiment described above, and it should be appreciated that the present invention may be variously modified.

For example, in the multi-layer ceramic capacitor 10, the capacitance forming unit 18 may be divided into capacitance forming units in the Z-axis direction. In this case, in each capacitance forming unit 18, the first internal electrodes 12 and the second internal electrodes 13 only need to be alternately disposed along the Z-axis direction. In a portion where the capacitance forming units 18 are next to each other, the first internal electrodes 12 or the second internal electrodes 13 may be continuously disposed.

What is claimed is:
1. A multi-layer ceramic capacitor, comprising:
a multi-layer unit having a height measured in a first direction, a width measured in a second direction orthogonal to the first direction, and a length measured in a third direction orthogonal to the first direction and the second direction, the length being larger the height and the width, the multi-layer unit including
ceramic layers laminated in the first direction, and
internal electrodes disposed between the ceramic layers; and a side margin that covers the multi-layer unit from the second direction and has a porosity of 1% or less, wherein a dimension of the side margin in the second direction is 5 μm or more and 15 μm or less, wherein the multi-layer unit further includes a cover disposed on the internal electrodes, a dimension of the cover in the first direction being larger than the dimension of the side margin in the second direction, and wherein each of the internal electrodes includes an oxidized area, the oxidized area being adjacent to the side margin and having a dimension in the second direction that is 0.4 μm or more.

2. The multi-layer ceramic capacitor according to claim 1, wherein the dimension of the side margin in the second direction is 10 μm or less.

3. A method of producing a multi-layer ceramic capacitor, comprising:

producing an unsintered multi-layer chip having a height measured in a first direction, a width measured in a second direction orthogonal to the first direction, and a length measured in a third direction orthogonal to the first direction and the second direction, the length being larger the height and the width, the multi-layer unit including a capacitance forming unit including
ceramic layers laminated in the first direction, and
internal electrodes disposed between the ceramic layers, and a cover that is made of insulating ceramics and covers the capacitance forming unit from the first direction;

producing an unsintered body by covering the unsintered multi-layer chip by a side margin made of insulating ceramics from the second direction; and producing a body by sintering the unsintered body, the side margin of the body after subjected to the sintering having a porosity of 1% or less, wherein a dimension of the cover in the first direction is larger than the dimension of the side margin in the second direction, a dimension of the side margin in the second direction being 5 μm or more and 15 μm or less after the sintering of the unsintered body, and wherein each of the internal electrodes includes an oxidized area, the oxidized area being adjacent to the side margin and having a dimension in the second direction that is 0.4 μm or more.

4. The method of producing a multi-layer ceramic capacitor according to claim 3, wherein the multi-layer chip punches out a side margin sheet mainly made of insulating ceramics, to cover the unsintered body with the side margin.

5. The method of producing a multi-layer ceramic capacitor according to claim 3, wherein the unsintered body is subjected to hydrostatic pressing.

6. The method of producing a multi-layer ceramic capacitor according to claim 3, wherein the unsintered body is subjected to debinder processing, and ceramics is deposited on the side margin subjected to the debinder processing.

7. The method of producing a multi-layer ceramic capacitor according to claim 6, wherein powder of ceramics is sprayed on the side margin subjected to the debinder processing.

8. The method of producing a multi-layer ceramic capacitor according to claim 6, wherein ceramics is spattered on the side margin subjected to the debinder processing.

9. The method of producing a multi-layer ceramic capacitor according to claim 6, wherein ceramics is vacuum-deposited on the side margin subjected to the debinder processing.

* * * * *